US006877750B2

(12) United States Patent
Engel

(10) Patent No.: US 6,877,750 B2
(45) Date of Patent: Apr. 12, 2005

(54) DRIVE ASSEMBLY FOR A MIXER

(75) Inventor: David Engel, Springwater, NY (US)

(73) Assignee: SPX Corporation, Charlotte, NC (US)

( * ) Notice: Subject to any disclaimer, the term of this patent is extended or adjusted under 35 U.S.C. 154(b) by 150 days.

(21) Appl. No.: 10/084,144

(22) Filed: Feb. 28, 2002

(65) Prior Publication Data

US 2003/0081500 A1 May 1, 2003

Related U.S. Application Data

(60) Provisional application No. 60/330,579, filed on Oct. 25, 2001.

(51) Int. Cl.[7] .................................................. F16J 15/12

(52) U.S. Cl. ........................ 277/637; 277/910; 366/331; 74/421 A; 475/331

(58) Field of Search ........................... 366/331; 277/602, 277/628, 637, 910; 403/292, 293; 464/170, 177; 475/331; 74/421 R, 421 A

(56) References Cited

U.S. PATENT DOCUMENTS

| | | | | | |
|---|---|---|---|---|---|
| 72,842 | A | * | 12/1867 | Goodwin | 74/421 R |
| 1,010,976 | A | * | 12/1911 | Sundh | 74/606 R |
| 1,057,112 | A | * | 3/1913 | Bavier | 277/447 |
| 1,059,450 | A | * | 4/1913 | Foote | 74/421 R |
| 1,289,375 | A | | 12/1918 | Bright | 464/177 |
| 1,488,985 | A | * | 4/1924 | Hoge | 74/421 R |
| 1,521,104 | A | * | 12/1924 | Jones | 74/421 R |
| 1,719,935 | A | * | 7/1929 | Jones et al. | 74/421 R |
| 2,081,040 | A | | 5/1937 | King | |
| 2,829,931 | A | | 4/1958 | De Pree et al. | |
| 2,891,513 | A | * | 6/1959 | Fagge | 92/84 |
| 2,901,295 | A | * | 8/1959 | Becker | 384/149 |
| 2,955,487 | A | * | 10/1960 | Malley | 475/341 |
| 3,033,056 | A | * | 5/1962 | Lennon | 74/606 R |
| 3,053,501 | A | * | 9/1962 | Varga | 251/332 |
| 3,055,237 | A | * | 9/1962 | Magnuson | 475/296 |
| 3,069,176 | A | * | 12/1962 | Woodcock et al. | 277/390 |
| 3,532,008 | A | * | 10/1970 | Fanstone | 475/300 |
| 4,032,118 | A | * | 6/1977 | Phillips | 366/251 |
| 4,281,565 | A | * | 8/1981 | Lower | 475/323 |
| 4,744,900 | A | | 5/1988 | Bratt | 210/321.78 |
| 5,126,609 | A | * | 6/1992 | Shimono et al. | 310/83 |
| 5,447,078 | A | * | 9/1995 | Robinson et al. | 74/606 R |
| 5,735,603 | A | * | 4/1998 | Kesig et al. | 366/331 |
| 6,012,837 | A | * | 1/2000 | Thuma | 366/294 |

* cited by examiner

*Primary Examiner*—David Sorkin
(74) *Attorney, Agent, or Firm*—Baker & Hostetler LLP

(57) ABSTRACT

A housing assembly and method for use on sanitary mixers and similar equipment that includes a cover sealed by sealing elements and supported by supporting elements. The cover covers at least a part of a drive component of the mixer such as a speed reducer.

12 Claims, 4 Drawing Sheets

DRIVE ASSEMBLY FOR A MIXER

PRIORITY

This application claims priority to the provisional U.S. Patent Application entitled, STAINLESS STEEL MIXING APPARATUS AND METHOD, filed Oct. 25, 2001, having a No. 60/330,579, the disclosure of which is hereby incorporated by reference.

FIELD OF THE INVENTION

The present invention relates generally to a method and apparatus for mixer components for use in e.g., sterile mixing applications. More particularly, the present invention relates to a method and apparatus for providing a cover over a drive component of a mixer.

BACKGROUND OF THE INVENTION

There are many circumstances where it is necessary to effect the mixing of materials under very sanitary conditions. These circumstances include, for example, the production of food products, the production of pharmaceutical products, the production of mineral products and the production of chemical products. The materials to be mixed can be of many forms such as mixed powders, wet granules, pastes, slurries and/or liquids. In order to attain the desired degree of sanitary environment, many manufacturers and producers of the aforementioned products employ stainless steel in the components of mixers in their manufacturing and production processes.

In the food industry, for example, stainless steel mixers are utilized to transform powdery materials into agglomerated products in order to instantize these products. Stainless steel mixers are also used to produce many of the ingredients contained within food products. In addition, ready-to-eat food products are mixed and manufactured using stainless steel mixers.

In the pharmaceutical industry, for example, stainless steel mixers are used to transform powdered pharmaceutical compounds into free flowing pastes prior to being fed into tableting machines. Stainless steel mixers are additionally used to produce homogeneous pharmaceutical mixtures by mixing multiple liquid pharmaceutical compounds together.

Stainless steel is utilized because the above-described processes are preferably and frequently required to be carried out according to stringent sanitary requirements. Stainless steel allows minimum contaminant accumulation on the mixer surfaces. This is due to the fact that stainless steel is easily cleaned and resistant to corrosion. Many mixers present in the art currently use stainless steel components in their mixer assemblies. These components range from stainless steel motors and shafts to mixing vessels and speed reducers. These mixers and mixer components have drawbacks however.

The cost of using stainless steel to manufacture mixers and mixer components is significantly high when compared to using conventional materials such as iron or steel. As a result of this high cost, the mixer purchase price is substantially higher than that of standard mixers. Due to this high purchase price, the cost of manufacturing and producing products with these stainless steel mixers increases. The cost is particularly noticeable in the case of drive components such as motors and/or speed reducers, which have a large number of complex parts. It is very expensive, for example, to manufacture a speed reducer so that all the exposed parts are made of stainless steel.

Accordingly, it is desirable to provide a housing for covering a drive system components for use in sanitary mixing applications. More particularly, there is a need for a housing that encloses a drive component such as a mixer gearbox and/or speed reducer, so that the gearbox and/or speed reducer has its exposed surfaces made of a material that is easily cleanable and/or resists corrosion, but at a significantly lower cost.

SUMMARY OF THE INVENTION

The foregoing needs are met, to a great extent, by the present invention where, in one aspect, a housing is provided for covering a portion of a drive component. The housing includes a cover and at least one support that supports the cover on drive component.

In accordance with another aspect of the present invention, a housing is provided for covering a portion of a drive component that has a cover and a sealing element that seals the cover to the drive component.

In accordance with yet another aspect of the present invention, a mixing apparatus is provided having a motor assembly and a mixing vessel configured for receiving material to be mixed. The mixing apparatus additionally includes a seal pedestal connected to the mixing vessel and a cover that is supported between the motor assembly and the seal pedestal, that covers at least part of a drive component connected between the motor assembly and seal pedestal.

In yet another aspect, the invention provides a method for covering at least a portion of a drive assembly. This method includes the steps of covering a portion of a drive component with a cover, and supporting the cover with at least one support.

In still another aspect, the invention provides a method for sealing at least a portion of a drive assembly. This method includes the steps of covering a portion of the drive component with a cover, and sealing the cover to the drive assembly.

There has thus been outlined, rather broadly, certain features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
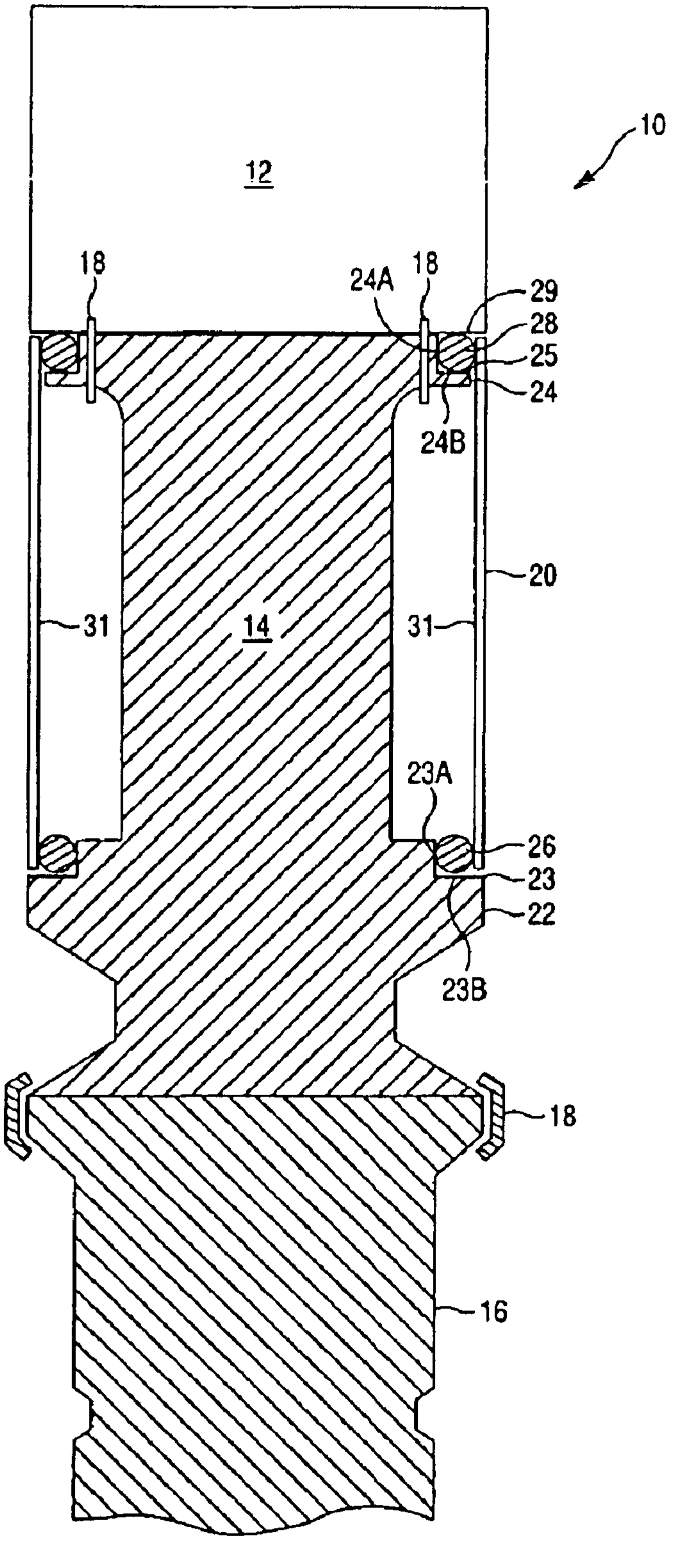
FIG. 1 is a schematic cross-sectional view of a housing assembly in accordance with the present invention in operational relationship with a drive component of a mixer.

The present invention provides a housing for disposing mixer drive components within a cover that can be made of a material that is easily cleanable and/or resists corrosion. The housing may preferably used in combination with a speed reducer for a mixer. It should be understood, however, that the present invention is not limited in its application to mixer speed reducers, but for example, can be used with other devices and/or drive components. The invention is particularly useful in sanitary processes, but can also be used in other processes.

Referring now to the figures wherein like reference numerals indicate like elements, FIGS. 1–5 illustrate presently preferred embodiments of a housing assembly. While in the embodiment depicted the housing assembly is utilized in combination with a drive assembly of a mixer, it should also be understood that the present invention is not limited in its application to mixer drive assemblies, and can be used for other types of drive devices including, for example, motors and transmissions or other mechanical devices.

Figure 2:
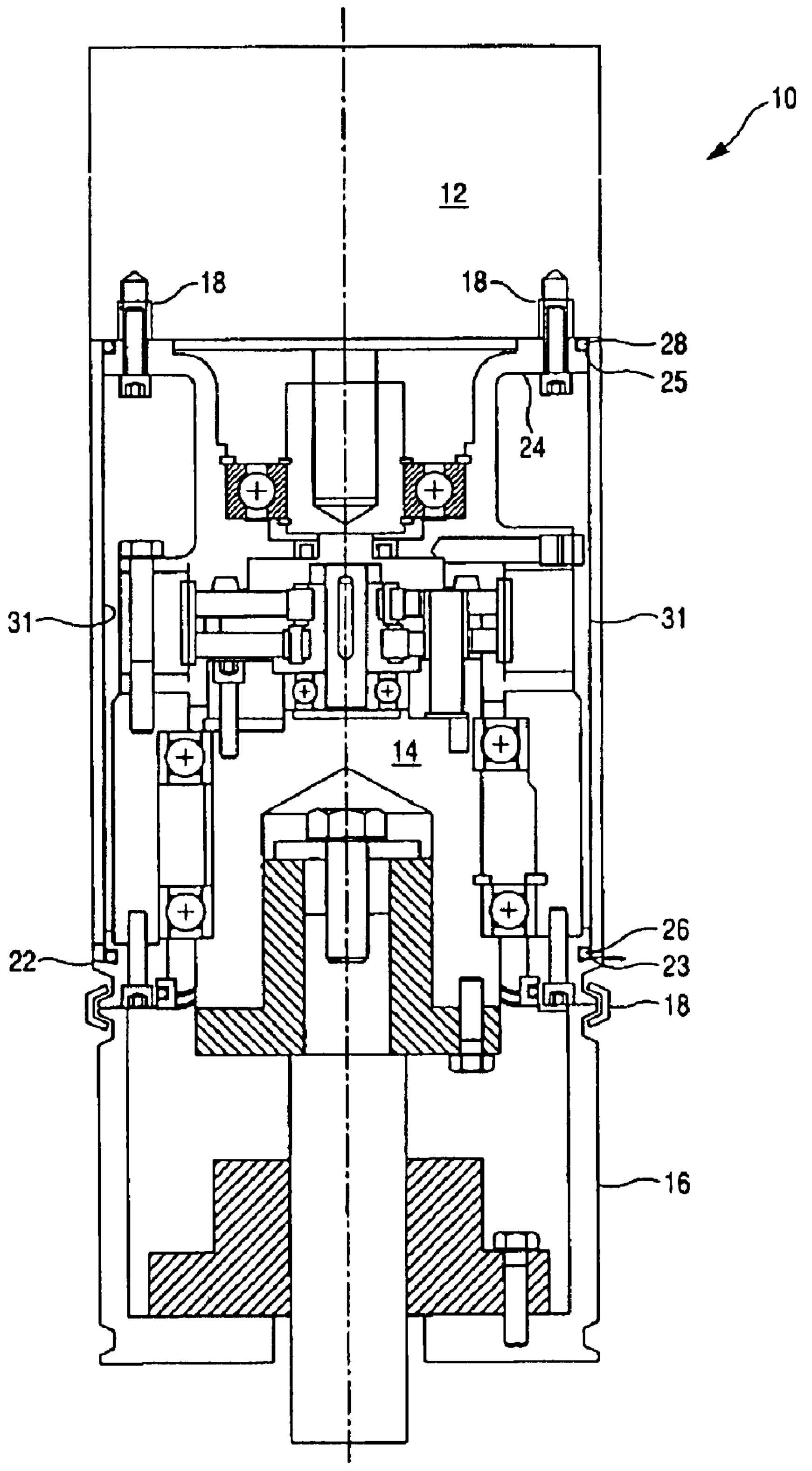
FIG. 2 is a cross-sectional view of a speed reducer employing a housing in accordance with the present invention.

FIGS. 1 and 2 depict cross-sectional views of a mixer drive assembly 10 having a first, upper portion 12, a second, middle portion 14, and a third, lower portion 16. More particularly, in the illustrated embodiment 10 the upper portion 12 includes a motor assembly, the middle portion 14 includes a speed reducer, and the lower portion 16 includes a seal pedestal. The speed reducer 14 is placed between the motor assembly 12 and the seal pedestal 16. The speed reducer 14 is affixed to the motor assembly 12 by an affixing means such as a screw or bolt 18 and the speed reducer 14 is affixed to the seal pedestal 16 utilizing a clamp such as a Tri-clamp® 18. The apparatus 10 also includes a cover 20, a first sealing element 26, a second sealing element 28, a first support 22, and a second support 24.

The supports 22 and 24 are preferably provided by flanges in the speed reducer 14. The first flange 22 has a diameter preferably greater than the diameter of the cover 20. The first flange 22 is preferably formed from a material that is easily cleanable and resists corrosion, for example, stainless steel, since it is exposed to the surrounding environment. The first flange 22 has a shoulder 23 upon which a first sealing element 26 is disposed. The second, flange 24 preferably has a diameter that is less than the diameter of the cover 20. The upper flange 24 also has a shoulder 25 upon a which a second sealing element 28 is disposed.

Sealing elements 26 and 28 are preferably elastomeric O-rings, however alternative sealing elements may be employed. As illustrated, O-ring 26 is disposed upon the shoulder 23 of the flange 22 and contacts both the cover 20 and the face 23A of the shoulder 23. Preferably, the O-ring 26 is positioned such that the cover 20 is radially supported by the O-ring 26 and does not touch the flange 22 or have any load-bearing contact the flange 22. However, the end of cover 20 may in some embodiments touch the shoulder 23 to rest on the shoulder 23 with a minimal load. The O-ring 26 exerts a slight radial force on both the shoulder 23 and the cover 20. This force provides sealing engagement between the flange 22 and the cover 20. This radial force can also tend to inhibit axial motion of the cover 20. The O-ring 26 is illustrated touching face 23A and not touching face 23B. However, the O-ring 26 may also touch the face 23B.

O-ring 28 is disposed upon the shoulder 25 of the flange 24. Preferably, the O-ring 28 is positioned such that the cover 20 is radially supported by the O-ring 28 and does not contact the motor assembly 12 with any load bearing contact. However, the end of over 20 may in some embodiments touch the end of the motor assembly 12 to rest against the motor assembly with a minimal load. The O-ring 28 exerts a slight radial force on both the flange 24 and the cover 20, providing sealing engagement between the flange 24 and the cover 20. This radial force also tends to inhibit axial motion of the cover 20. The O-ring 26 is illustrated touching face 23A and not touching face 23B. However, the O-ring 26 may also touch the face 23B.

The aforementioned sealing engagement between the flanges 22 and 24 the O-rings 26 and 28, and the cover 20 affords the interior atmosphere of the speed reducer 14 to be isolated from the outside mixer environment, which is desirable when the mixer is operating under sanitary conditions. In addition, these parts are dimensioned to allow for the upper and lower flanges, 24 and 22 respectively, to confine the cover 20 between these respective supports so that it floats between them and does not carry any significant load.

Figure 3:
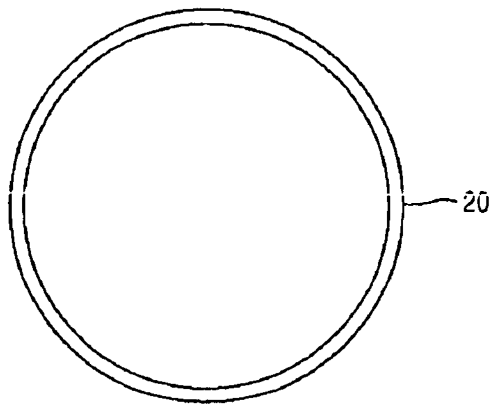
FIG. 3 is a top view of a cover in accordance with the present invention.

Referring now to FIG. 3, looking at a top view of cover 20, the cover 20 includes a curved side wall 30. As illustrated in FIGS. 1 and 2, the cover 20 has one end that is adjacent the motor assembly 12 when installed and another end that is adjacent the seal pedestal 16 when installed, and the cover 20 extends between the base of the motor assembly 12 and the flange 22. The motor assembly 12 is located above the stainless steel cover 20 where it acts as an "upper stop" to the cover 20. The flange 22 is located at a lower portion of the speed reducer 14, and acts as a "lower stop" to the cover 20.

In the embodiment depicted, the cover 20 is cylindrical in shape, preferably, a hollow cylinder. In addition, the cover 20 is preferably formed from a cleanable, corrosive-resistant material, such as for example stainless steel. More particularly, the cover 20 is constructed from six-inch welded stainless steel pipe for example. Preferably, the length of the cover 20 is toleranced to be less than the axial length between face 23B of the speed reducer and the end 29 of the motor, preventing the cover 20 from contacting the face 23B and the end 29 at the same time. This prevents an undesirable degree of axial compressive load from being put on the cover 20.

As further illustrated by FIG. 1, the stainless steel cover 20 preferably rests on the O-ring 26, providing a lower sealing means for the cover 20. The cover 20 additionally rests on the O-ring 28, providing an upper sealing means for the cover 20. The above-described interaction between the stainless steel cover 20 and the O-rings 26, 28 allows for the stainless steel cover 20 to float with respect to the speed reducer assembly 14, and in some embodiments not touch either the motor 12 or flange 22. Thus, the cover 20 does not need to carry any significant axial load. In addition, the cover 20 also receives some radial outward forces from the O-rings 26 and 28. The O-rings 26 and 28 also tend to inhibit axial movement of the cover 20 to a limited degree.

Alternatively, an end of the cover 20 may directly contact either one of the motor assembly 12 or the flange 22 and therefore not completely float between the two supports. However, the cover 20 is toleranced so that it does not extend the entire distance between the motor assembly 12 and the flange 22. The resting position of the cover is determinative of whether a gap exists between the cover 20 and the motor assembly 12, or exists between the cover 20 and the flange 22. For example, if the cover 20 rests on the flange 22, a gap exists between the cover 20 and the motor assembly 12 and vice versa. However, even though the cover may directly contact one of the flange 22 or the motor assembly 12, the cover 20 again does not function as a structural component and therefore does not carry any significant load.

As previously described, the flange 22 can function both (1) as an axial positioning element or stop and (2) as a radial supporting element via O-ring 26. The flange 22 is utilized in combination with a clamp 18, preferably a Tri-Clamp® to affix the speed reducer 14 to a seal pedestal 16. In another aspect, as described above, the flange 22 in combination with the O-ring 26, functions as a lower stop or axial positioning element for the stainless steel cover 20, allowing the cover 20 to remain in a stationary axial position, between the motor assembly 12 and the flange 22.

A function of the O-rings 26 and 28 is to provide a sealing arrangement for the stainless steel cover 20, in addition to providing some radial support as described above. This sealing arrangement allows for components such as a speed reducer to be disposed with the stainless steel cover 20, and be sealed within the cover 20, effectively preventing exposure of the components to the outside environment. This sealing allows the components contained within the cover 20 to function during mixer operation without contaminating the outside environment with operating fluids and/or foreign particles. Therefore, the environment outside the mixer remains sanitary which is desirable for many mixer applications. In addition, the sealing allows the cover 20 to be cleaned easily, without any need to clean the components contained inside the cover 20.

FIG. 2 shows a conventional, concentric speed reducer 14 disposed within the stainless steel cover 20. Preferably, the speed reducer 14 as illustrated is a reducer having a desirably small outer diameter, such as an epicyclic reducer or a planetary reducer. A conventional speed reducer and its components may be modified by reducing the concentric reducer's diameter, length and width to fit within a suitable cover dimension if needed. For example, the outer diameter of the speed reducer can be decreased by machining the reducer's frame which also translates into a reduced width. The overall length of the speed reducer can be shortened by closely coupling the speed reducer assembly to the mixer motor assembly. The speed reducer can also be coupled to the motor assembly without the assistance of a flexible coupler element placed between the motor and reducer assemblies, to decrease the reducer length. Of course, the cover may also be made of a suitable size to cover larger speed reducers or other components.

The cover 20 is not limited in its application to mixer speed reducers. Alternatively, the cover 20 may be utilized to house various mixing drive assembly components that may be used under sanitary conditions. For example, the cover 20 may be used to cover standard drive shafts, motors and/or gear assemblies of driven rotating devices. The cover 20 may be used to cover any drive system components, speed reducers, drive shafts, bearings, motors, seal cartridges.

Although in the preferred embodiment a cylindrical cover 20 is described, alternatively configured cover designs may be employed. For example, the assembly may utilize a cover wherein the side walls are not circular but form a shape similar to that of a square or rectangle. In addition, the assembly may utilize a cover wherein the side walls taper toward each other, forming a shape similar to that of a cone.

Figure 4:
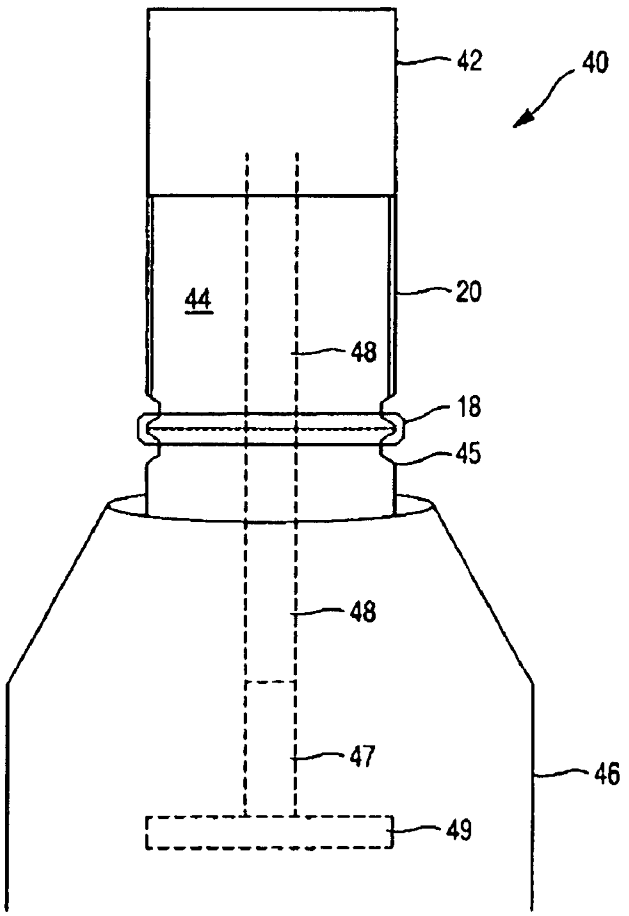
FIG. 4 is a side view of a mixer assembly employing a housing in accordance with the present invention.

Referring now to FIG. 4, a mixer assembly 40 is illustrated employing the cover 20 of the present invention. The mixer assembly 40 includes a driving means 42 such as a motor or turbine attached to a gear assembly 44 such as a speed reducer or gear box. The mixer assembly 40 also includes a mixing vessel 46 configured for containing the material to be mixed. As illustrated, the cover 20 is restrained between the driving means 42 and the seal pedestal 45 of the mixing vessel 46. The speed reducer 44 is surrounded by the stainless cover 20. The mixer assembly additionally includes a rotatable shaft 48 extending from the driving means 42 and speed reducer 34 into the mixing vessel 46. The rotatable shaft 48 may be connected to an impeller shaft 47 to rotate an impeller 49.

The speed reducer 44 illustrated in FIG. 4 is preferably a conventional, concentric speed reducer reconfigured such that it may be disposed within the cylindrical stainless steel cover 20. However, standard speed reducers may also be used in combination with the present invention.

Although the cover 20 is described as being stainless steel, the cover can be made of other materials. For example, the cover can be made of other metals, alloys, plastics and/or ceramics.

Figure 5:
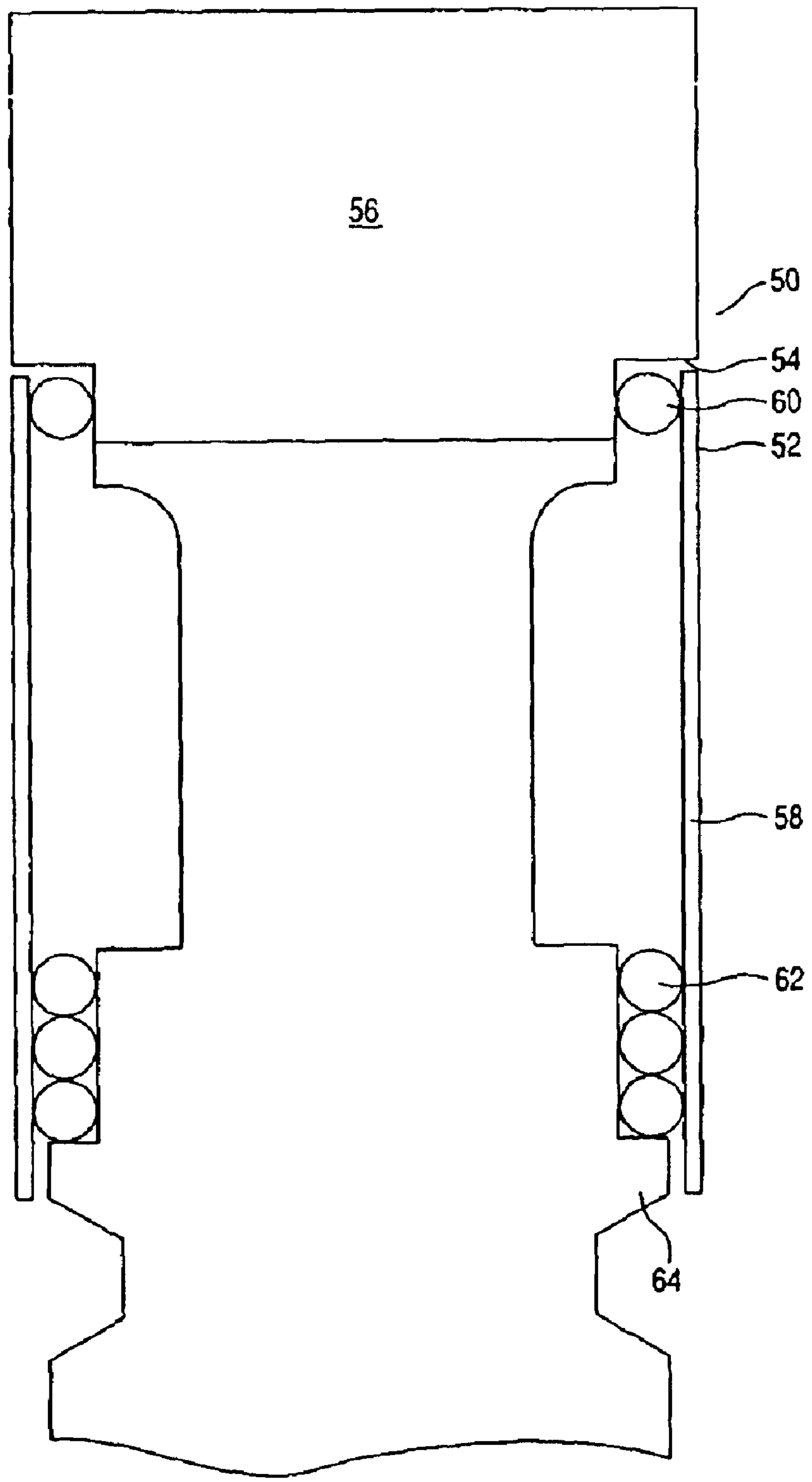
FIG. 5 is a cross-sectional view of a housing assembly in accordance with two alternative embodiments of the present invention.

Referring now to FIG. 5, an alternative embodiment 50 in accordance with the present invention is depicted. The illustrated alternative embodiment is similar to previously described embodiments, except for the interaction between the O-rings and the flanges. The O-ring 60 is disposed within a shoulder 54 located on the mixer motor assembly 56, instead of shoulder 25 (FIGS. 1 and 2), which can be omitted. This configuration illustrates that the sealing elements of the present invention can be supported on a component adjacent the drive component being covered by the cover 58, or supported by the drive component itself. The O-rings 62 can be a set of adjacent O-rings supported by a flange 64. The use of plural stacked O-rings 62 can provide enhanced resistance to vertical movement of the cover 58, so that the shoulder 64 can have a outer diameter less than the inner diameter of the cover 58, and the cover 58 can extend down over the shoulder 64. This illustrates that the O-rings themselves can serve instead of a stop in the axial direction.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A drive assembly for a mixer having a motor assembly and a seal pedestal, comprising:

a concentric speed reducer having a first end and a second end, with the first end adapted to be rigidly mounted to the motor assembly and the second end adapted to be rigidly mounted to the seal pedestal;

a first flange at the first end of the speed reducer;

a second flange at the second end of the speed reducer;

a cylindrical cover that has an inner surface that defines an inner diameter and that substantially surrounds the speed reducer and substantially extends from the first end of the speed reducer to the second end of the speed reducer;

a first elastomeric ring disposed in between the first flange and the inner surface of the cover to support the cover; and a second elastomeric ring disposed in between the second flange and the inner surface of the cover to support the cover wherein the first and second flanges and the cylindrical cover all remain stationary with respect to the seal pedestal, wherein the second flange comprises a shoulder with a projection having an outer diameter greater than the inner diameter of the cover, so that the cover is restrained from axial movement in one direction by the projection.

2. The drive assembly according to claim 1, wherein the first flange comprises a shoulder that supports the first elastomeric ring, having an outer diameter of the first flange being less than the inner diameter of the cover, and with the cover extending over the first flange.

3. The drive assembly according to claim 1, wherein the cover is made from stainless steel.

4. The drive assembly of claim 1, wherein the cover is substantially restrained axially and radially by the first and second elastomeric rings, without any direct touching contact between the cover and the first and second flanges.

5. The drive assembly of claim 1, wherein the first and second elastomeric rings each comprise rubber O-rings.

6. The drive assembly of claim 5, wherein the O-rings have a substantially circular cross section.

7. A drive assembly for a mixer having a motor assembly and a seal pedestal, comprising:

a concentric speed reducing means having a first end and a second end, with the first end adapted to be rigidly mounted to the motor assembly and the second end adapted to be rigidly mounted to the seal pedestal;

a first flange at the first end of the speed reducing means;

a second flange at the second end of the speed reducing means;

covering means for covering the speed reducing means, that has an inner surface that defines an inner diameter and substantially surrounds the speed reducing means and substantially extends from the first end of the speed reducing means to the second end of the speed reducing means;

a first elastomeric sealing and supporting means disposed in between the first flange and in the inner surface of the covering means to support the covering means; and a second elastomeric sealing and supporting means that is disposed in between the second flange and the inner surface of the second end of the covering means to support the covering means, and wherein the first and second flanges and the covering means all remain stationary with respect to the seal pedestal, wherein the second flange comprises a shoulder with a projection having an outer diameter greater than the inner diameter of the covering means, so that the covering means is restrained from axial movement in one direction by the projection.

8. The drive assembly according to claim 7, wherein the first flange comprises a shoulder that supports the first elastomeric sealing and supporting means, having an outer diameter of the first flange being less than the inner diameter of the covering means, and with the covering means extending over the first flange.

9. The drive assembly according to claim 7, wherein the covering means is made from stainless steel.

10. The drive assembly of claim 7, wherein the covering means is restrained substantially axially and radially by the elastomeric sealing and supporting means, without any direct touching contact between the covering means and the first and second flanges.

11. The drive assembly of claim 7, wherein the first and second elastomeric sealing and supporting means each comprise rubber O-rings.

12. The drive assembly of claim 11, wherein the O-rings have a substantially circular cross section.

* * * * *